Feb. 15, 1966  W. E. WALTON ETAL  3,235,159
FRICTION WELDING MACHINE

Filed Feb. 14, 1964  2 Sheets-Sheet 1

INVENTORS
MELVIN SPAT
WILFRED E. WALTON
BY

ATTORNEY

Feb. 15, 1966  W. E. WALTON ETAL  3,235,159
FRICTION WELDING MACHINE
Filed Feb. 14, 1964  2 Sheets-Sheet 2
FIG. 4
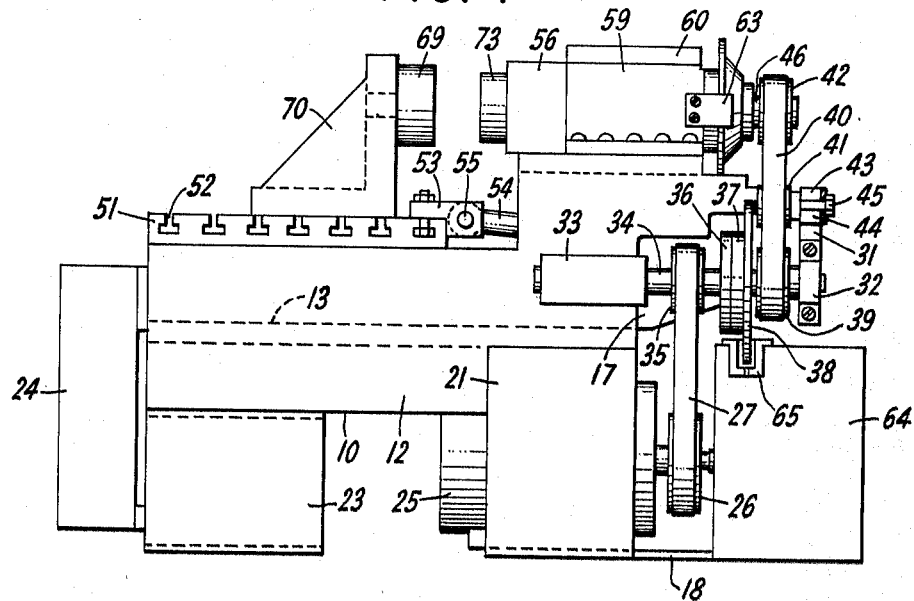
FIG. 5
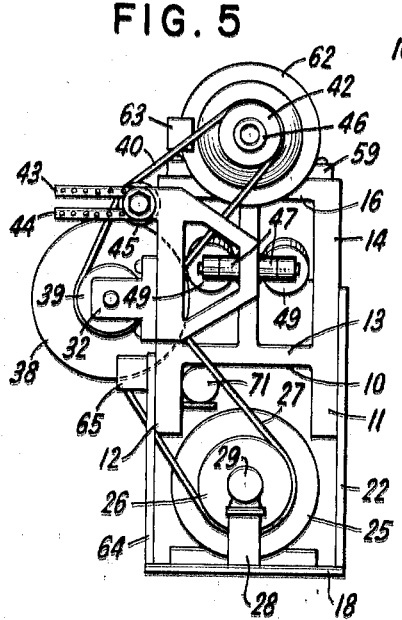
FIG. 6
FIG. 7
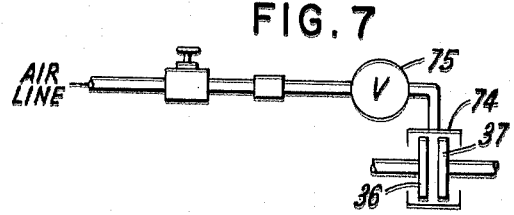
INVENTORS
MELVIN SPAT
WILFRED E. WALTON
BY
ATTORNEY

United States Patent Office 3,235,159
Patented Feb. 15, 1966

3,235,159
FRICTION WELDING MACHINE
Wilfred Eugene Walton, Norwalk, and Melvin Spat, Stamford, Conn., assignors to American Machine & Foundry Company, a corporation of New Jersey
Filed Feb. 14, 1964, Ser. No. 344,972
4 Claims. (Cl. 228—2)

This invention relates in general to welding apparatus; and, more particularly, to a production friction welding machine.

An object of this invention is to provide a friction welding machine which may be more easily set up and operated for the rapid or production friction welding of workpieces.

Another object of this invention is to provide a more rugged and stronger friction welding machine frame which will better withstand the great stresses set up within it during a friction welding cycle.

A further object of this invention is to provide a less costly and more easily constructed friction welding machine frame.

Still another object of this invention is to provide a more versatile friction welding machine in that it may be easily adapted to be loaded from any direction.

Many other objects, advantages, and features of invention reside in the construction, combination and arrangement of parts involved in the embodiment of the invention and its practice as will be understood from the following description and accompanying drawing wherein:

FIGURE 1 is a longitudinal vertical section through a friction welding machine constructed according to this invention, the section being taken on lines 1—1 of FIGURE 2;

FIGURES 2 and 3 are transverse vertical sections taken on lines 2—2 and 3—3, respectively, of FIGURE 1;

FIGURE 4 is a view of the back of the friction welding machine with the tailstock and the headstock chucks removed.

FIGURE 5 is an end view from the headstock end of the friction welding machine;

FIGURE 6 is a greatly simplified schematic diagram of hydraulic circuitry which could be used to friction weld with this machine; and FIGURE 7 is a greatly simplified schematic diagram of pneumatic circuitry which could be used to friction weld with this machine.

Figure 1:
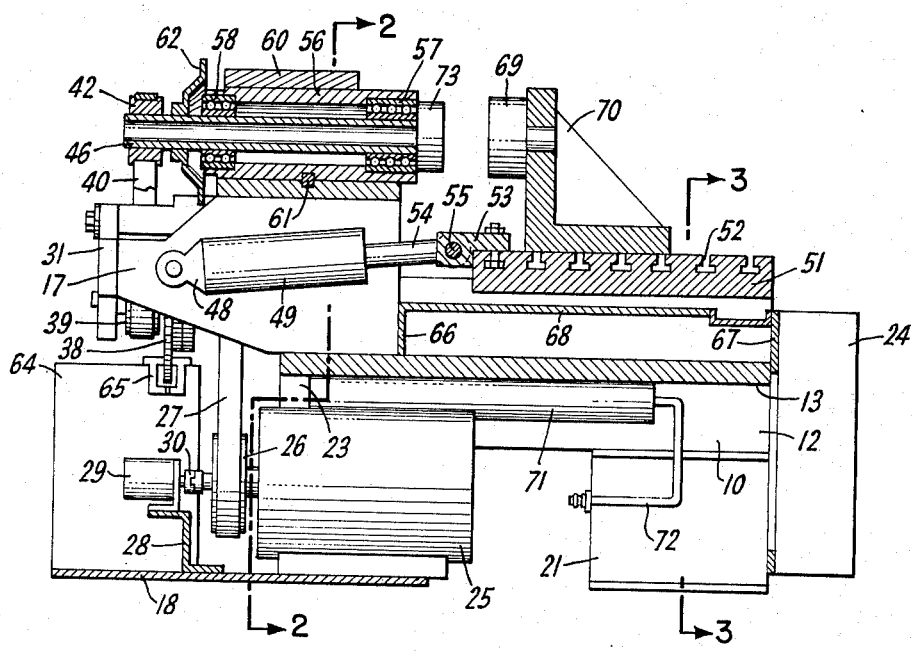

Referring to the drawing in detail, the bed of the friction welding machine consists of an H beam 10 having the side members 11 and 12 and the central web 13. At the headstock end of the machine the side members 11 and 12 have the upwardly and rearwardly extending additions 14 and 15 welded to them. A top plate 16 is welded to extend across the upper edges of the additions 14 and 15. A central brace 17 is welded to extend between the top plate 16 and the web 13. These elements comprise the main frame of the friction welding machine to which the other elements are secured.

Referring further to the drawing, the H beam 10 is supported above the base plate 18 by the side channels 20, 21, side plates 22, 23 as well as other structural members which are not shown. Secured at the tailstock end (optional location) of the machine is a large box 24 containing electrical timers, controls, and related circuitry which accurately controls the cycle of a friction weld within desired limits.

Mounted on base plate 18 is the motor 25. The shaft of motor 25 carries a pulley 26 which drives a link belt or the like 27. A bracket 28 is fixed to base plate 18 and supports the hydraulic pump 29 beyond pulley 26. A coupling 30, as shown in FIGURE 1, connects the shaft of motor 25 to the hydraulic pump 29. Thus the motor 25 constantly drives both the pulley 26 and the pump 29.

Referring now to FIGURES 4 and 5, a bracket 31 is fixed to the rearmost ends of the central brace 17 and the addition 15 of side member 12. The lower side of bracket 31 has a bearing support 32 fixed to it. Side member 12 has a shaft bearing assembly 33 fixed to it. A jack shaft 34 is rotatably secured by the bearing support 32 and the shaft bearing assembly 33. A pulley 35 is mounted on jack shaft 34 and driven by belt 27 so that motor 25 constantly drives the jack shaft 34. The other clutch disk 37, a brake disk 38, and a pulley 39 are rotatably mounted as a single unit on the jack shaft 34.

Pulley 39 drives belt 40 which passes about idler pulley 41 and the spindle pulley 42. Thus it may be seen that the clutch disks 36 and 37 must be engaged before motor 25 can drive the pulley 39 and thereby the spindle pulley 42.

As may be seen in FIGURE 5, bracket 31 has two projecting arms 43 and 44 extending laterally from its upper portion. The arms 43 and 44 have a number of positions formed on them to which an eccentric mounting assembly 45 may be fixed to position the idler pulley 41. When it is desirable to change the pulleys 39 and 42 to enable motor 25 to drive the spindle 46 at a different speed, the idler pulley 41 may be quickly and rapidly moved to adjust the tension on belt 40.

Figure 2:
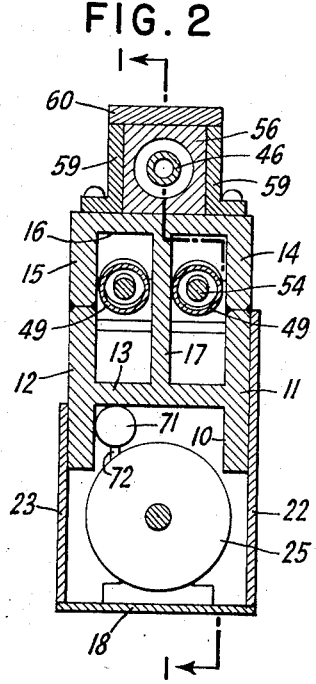

Referring now to FIGURES 1, 2 and 5, a heavy transverse pin 46' extends through the lateral bosses 47 which are welded to extend from the central brace 17. The pin 46' secures the rearmost ends 48 of the hydraulic cylinders 49 to the central brace 17.

Figure 3:
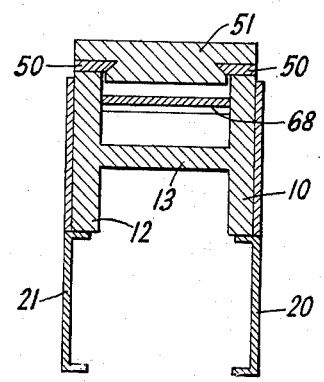

Referring now to FIGURES 1 and 3, ways 50 are fixed to the upper edges of the side members 11 and 12 of H beam 10. A heavy table 51, containing the transverse T slots 52, is slidably mounted on the ways 50. A connecting block 53 may be fixed to the headstock end of table 51 and has the piston rods 54 of the hydraulic cylinders 49 fixed to it by means of pins 55. Optionally, cylinders 49 may be connected directly to table 51 by a pivotable connection.

As shown in FIGURES 1, 2, 4 and 5, the headstock of this machine consists of the spindle 46 which is rotatably mounted within the bearing block 56 by means of suitable thrust and radial bearings 57 and 58. The bearing block 56 may be fixed to the top plate 16 by means of the side flanges 59 which are bolted to the top plate 16 and an upper retaining plate 60 is bolted over the upper edges of the flanges 59. A keyway 61 prevents longitudinal movement of the bearing block 56.

The rearward end of spindle 46 has the dished brake disk 42 mounted on it. A hydraulic brake 63 is mounted on a side flange 59 to engage the brake disk 62. On a side plate 64 is mounted a second hydraulic brake 65 which engages the brake disk 38 rotatably mounted on jack shaft 34 with clutch disk 37 and pulley 39.

As shown in FIGURES 1 and 3, end plates 66 and 67 and a top plate 68 form a reservoir for hydraulic fluid in the upper portion of the H beam 10. This reservoir for hydraulic fluid below the table 51 has a large capacity and does away with the necessity of having a separate hydraulic fluid tank. A hydraulic accumulator 71 may be placed within H beam 10 below the web 13. A charging line 27 leads to a fitting for connection to a source of compressed gas for charging the accumulator.

Referring now to FIGURE 1, any suitable tailstock chuck or fixture 69 may be secured by a bracket 70 to the table 51 in any desired position by the T slots 52 and suitable bolts.

The friction welding machine of this invention may be operated in the following manner: As shown in FIGURE 1, a suitable headstock chuck 73 is fixed to the front end of spindle 46. Workpieces to be welded are secured in the chucks 73 and 69. Motor 25 is left running continuously when the machine is being used so that it drives pump 29 and jack shaft 34.

As shown in FIGURE 7, a valve 75 is opened allowing air from the line to activate the air clutch 74 and engage the clutch plates 36 and 37. Simultaneously valve 78 is operated to release brakes 63 and 65. Motor 25 then drives pulley 39 and, by means of belt 40 and pulley 42, rotates the spindle 46 and chuck 73.

Referring to FIGURE 6, valve 76 is set so that pump 29 will force hydraulic fluid through pipes 77 to cause the hydraulic cylinders 49 to draw the piston rods 54 inward. The withdrawing of rods 54 slides table 51 along the ways 50 until the stationary workpiece in chuck 69 is forced against the rapidly rotating workpiece in the driven chuck 73. A desired hydraulic pressure is maintained by adjustable valve or valves "E" in the line to the cylinders 49 to force the relatively rotating workpieces together until sufficient frictional heat is developed in the area of contact between the workpieces to accomplish a weld. Valve 75 is then operated disengaging the air clutch 74, and valve 78 is operated so that the brakes 63 and 65 engage the brake disks 62 and 38 to stop the rotation of the spindle and the elements rotatably mounted on jack shaft 34. Brake 65 and brake disk 38 are required only to prevent the inertia of the rotatably mounted elements on jack shaft 34 from causing belt 40 to slip and jump on pulleys 39 and 42 with resultant damage to belt 40. When the rotating workpiece is brought to a stop, the workpieces are continued to be forced together to complete the friction weld. If it is required in a given weld, valve E may be adjusted to increase the weld pressure after the relative rotation of the workpieces ceases (I).

After opening either chuck 73 or 79, valve 76 may be activated to move table 51 and chuck 69 away from chuck 73, after which the welded workpieces may be removed.

New workpieces may then be placed in the chucks 69 and 73 and a new welding cycle may be started. The crude circuitry shown in FIGURES 6 and 7 is purely exemplary to show how a weld may be accomplished on this machine. Timing devices, pressure controls, limit switches, and the like are provided to control the parameters of given welding cycles.

The friction welding machine of this invention is particularly versatile in that any desired production chuck, such as an air chuck, hydraulic chuck or vise, or the like, may be mounted on the table 51. This chuck may be loaded from the top, either side, or from the tailstock end of the machine. Workpieces fed to the chuck 73 fixed to the headstock end of the machine may be fed through the hollow spindle 46 if desired.

While this invention has been shown and described in the best form known, it will nevertheless be understood that this is purely exemplary and that modifications in the construction, arrangement and combination of parts may be made without departing from the spirit of the invention except as it may be more limited in the appended claims.

What is claimed is:
1. In a friction welding machine,
   (a) a frame weldment comprising a horizontal H beam having two side members and a central web, support means fixed on top of one end of each side member, a top plate fixed between the tops of said support means, and a central brace extending between said web and said top plate;
   (b) a table slidably mounted on said H beam weldment in front of said support means;
   (c) hydraulic cylinders attached to said weldment and attached to said table; and
   (d) a spindle rotatably mounted above said top plate parallel to said H beam, said cylinders drawing said table along said H beam toward said spindle.

2. The combination according to claim 1 with the addition of
   (a) end plates extending upward from said web between said side members, and
   (b) a cover plate extending between said side members and said end plates below said table forming a reservoir for hydraulic fluid.

3. A friction welding machine comprising, in combination,
   (a) a frame having a horizontal H beam weldment with two side members and a horizontal central web, projecting additions fixed on top of one end of each side member of said H beam, a top plate extending between the tops of said additions, and a central brace extending between said web and said top plate;
   (b) a table slidably mounted on said H beam in front of said additions,
   (c) hydraulic cylinders attached to weldment attached to said table;
   (d) a spindle rotatably mounted on top of said top plate parallel to said H beam;
   (e) end plates extending above said web between said side members;
   (f) a cover plate extending between said side members and said end plates below said table forming a reservoir for hydraulic fluid;
   (g) a motor mounted beneath said H beam;
   (h) a first pulley driven by said motor;
   (i) a hydraulic pump driven by said motor;
   (j) hydraulic circuitry directing hydraulic fluid drawn from said reservoir by said pump to said cylinders so that said cylinders may draw said table toward said spindle and urge said table away from said spindle;
   (k) a jack shaft mounted parallel to said spindle and said motor;
   (l) a second pulley on said jack shaft;
   (m) a belt disposed about said first and second pulleys so that said first pulley drives said second pulley and thereby said jack shaft;
   (n) a third pulley rotatably mounted on said jack shaft;
   (o) clutch means on said jack shaft enabling said jack shaft to drive said third pulley;
   (p) a fourth pulley mounted on said spindle;
   (q) belt means about said third and fourth pulleys so that said third pulley may drive said fourth pulley and thereby said spindle;
   (r) first brake disk mounted on said spindle;
   (s) first brake means engaging said first brake disk to rapidly stop rotation of said spindle;
   (t) a first chuck mounted on said spindle; and
   (u) a second chuck or fixture mounted on said table facing said first chuck.

4. The combination according to claim 3 with the addition of
   (a) a second brake disk rotatably mounted on said jack shaft and connected to said third pulley, and
   (b) second brake means engaging said second brake disk as said first brake means engages said first brake disk.

No references cited.

WHITMORE A. WILTZ, *Primary Examiner.*